US009225594B2

(12) United States Patent
Klessig et al.

(10) Patent No.: US 9,225,594 B2
(45) Date of Patent: Dec. 29, 2015

(54) ETHERNET LOCAL MANAGEMENT INTERFACE (E-LMI)

(71) Applicant: Cisco Technology, Inc., San Jose, CA (US)

(72) Inventors: Robert W. Klessig, Los Altos Hills, CA (US); Grace J. Koo, San Francisco, CA (US); Vojislav Vucetic, Holmdel, NJ (US)

(73) Assignee: Cisco Technology, Inc., San Jose, CA (US)

( * ) Notice: Subject to any disclaimer, the term of this patent is extended or adjusted under 35 U.S.C. 154(b) by 146 days.

(21) Appl. No.: 13/784,233

(22) Filed: Mar. 4, 2013

(65) Prior Publication Data

US 2013/0176898 A1    Jul. 11, 2013

Related U.S. Application Data

(63) Continuation of application No. 10/811,458, filed on Mar. 26, 2004, now Pat. No. 8,392,509.

(51) Int. Cl.
*H04L 12/28* (2006.01)
*H04L 12/24* (2006.01)
*H04L 12/26* (2006.01)
*H04L 12/46* (2006.01)

(52) U.S. Cl.
CPC ........ *H04L 41/0803* (2013.01); *H04L 12/4633* (2013.01); *H04L 41/085* (2013.01); *H04L 43/0817* (2013.01)

(58) Field of Classification Search
CPC .................................................. H04L 41/0803
USPC ........................................................ 370/254
See application file for complete search history.

(56) References Cited

U.S. PATENT DOCUMENTS

| | | | | |
|---|---|---|---|---|
| 6,058,114 | A * | 5/2000 | Sethuram et al. | 370/397 |
| 2004/0133619 | A1* | 7/2004 | Zelig et al. | 709/200 |
| 2005/0099949 | A1* | 5/2005 | Mohan et al. | 370/236.2 |

* cited by examiner

*Primary Examiner* — Peter Shaw
(74) *Attorney, Agent, or Firm* — Campbell Stephenson LLP

(57) ABSTRACT

An Ethernet local management interface (E-LMI) protocol for use at a user-to-network interface (UNI) of a Metro Ethernet Network (MEN) is disclosed. The E-LMI protocol allows configuration and status information for the services at the UNI to be transferred from the MEN to a customer edge device coupled to the MEN at the UNI. Various embodiments involve sending or receiving a message via a User-to-Network Interface (UNI) of a Metro Ethernet Network (MEN). A customer edge device extracts configuration and status information for the services at the UNI from a received message. The configuration and status information can correspond to a multipoint Ethernet Virtual Connection (EVC).

26 Claims, 10 Drawing Sheets

CE-VLAN ID/EVC Map
Information Element 408(3)

UNI Information Element 408(4)

EVC Information Element 408(5)

Single EVC Status Information Element 408(6)

ETHERNET LOCAL MANAGEMENT INTERFACE (E-LMI)

CROSS-REFERENCE TO RELATED APPLICATIONS

This application is a continuation of U.S. patent application Ser. No. 10/811,458, entitled "ETHERNET LOCAL MANAGEMENT INTERFACE (E-LMI)" filed Mar. 26, 2004, and naming Robert W. Klessig, Grace J. Koo, Vojislav Vucetic as the inventors. This application is assigned to Cisco Technology, Inc., the assignee of the present invention, and is hereby incorporated by reference in its entirety and for all purposes as if completely and fully set forth herein.

FIELD OF THE INVENTION

This invention relates to networking and, more particular, to Metro Ethernet Networks.

BACKGROUND

Service providers use Metropolitan Area Networks (MANs) to provide customers with connectivity to the Internet and/or with connectivity to geographically diverse customer locations. Historically, MANs have been implemented using Synchronous Optical Networks (SONET), Frame Relay, or Asynchronous Transfer Mode (ATM) technologies. Recently, however, service providers have begun to use Ethernet technology to implement MANs. These Ethernet-based MANs are referred to as Metro Ethernet Networks (MENs). Many technologies can be used to implement a MEN. However, all MENs use Ethernet to connect the subscriber's equipment, called a Customer Edge (CE) device, to the MEN.

In order for a customer to use the services of a MEN, it is necessary to configure the customer's equipment to match the features and attributes of each specific service provided by the MEN. This configuration of the customer's equipment needs to be performed when the customer's equipment is initially connected to the MEN and whenever the MEN is modified to provide new or different services. Configuring the customer's equipment involves programming the customer's equipment with the values of a wide variety of parameters. Since a MEN can support many EVCs (Ethernet Virtual Connections), and each EVC can in turn support several features, the number of parameters can be significant. Manually programming these values is both time-consuming and error-prone, which can lead to both customer and service provider frustration. Accordingly, improved techniques for configuring customer equipment for use with a MEN are desired.

SUMMARY

Various embodiments of methods and systems for implementing an Ethernet local management interface (E-LMI) protocol at a user-to-network interface (UNI) of a Metro Ethernet Network (MEN) are disclosed. The E-LMI protocol allows configuration and status information for the services at the UNI to be transferred from the MEN to a customer edge device coupled to the MEN at the UNI.

In some embodiments, a method involves receiving a message via a User-to-Network Interface (UNI) of a Metro Ethernet Network (MEN) and extracting configuration information for the services at the UNI from the message. The message is encapsulated in an Ethernet frame, and the Ethernet frame includes a source address. This method can be performed by a customer edge device. Program instructions executable to implement this method can be stored on a computer readable medium.

The Ethernet frame, in which the message is encapsulated, can also include a type field. The value of the type field identifies the Ethernet frame as a Local Management Interface (LMI) frame. In one embodiment, the Ethernet frame also includes a destination address. The value of the destination address indicates that the Ethernet frame should not be forwarded.

In one embodiment, the message also includes a message type field and a report type field. In such an embodiment, the method involves sending a message requesting an additional portion of a status report via the UNI, in response to the report type field indicating that the status report spans multiple messages. Additionally, the message can include one or more information elements. One of the information elements includes a flag. The method can also involve determining whether the information element spans multiple messages based on the flag.

In one embodiment, the message includes information identifying each of several locations of customer edge devices coupled by a multipoint Ethernet Virtual Connection (EVC). The information can also identify the state of a connection to each of the customer edge devices. The locations of the customer edge devices coupled by the multipoint EVC can be identified by identifying each of the UNIs included in the multipoint EVC. If the multipoint EVC is a point-to-multipoint EVC, the information identifies whether each of the UNIs is a leaf UNI or a root UNI. The message can include additional information identifying one of: an ingress bandwidth profile of the UNI; a state of the UNI; a state of an EVC; an ingress bandwidth profile of the EVC; and a bandwidth profile of a Class of Service (CoS).

In some embodiments, a method involves detecting a trigger condition and sending a message via a (User-to-Network Interface) UNI of a Metro Ethernet Network (MEN) in response to the trigger condition. The message is encapsulated in an Ethernet frame, and the Ethernet frame includes a source address. This method can be performed by a provider edge device within the MEN. Program instructions executable to implement this method can be stored on a computer readable medium.

In other embodiments, a method involves receiving a message via a User-to-Network Interface (UNI) of a Metro Ethernet Network (MEN) and extracting configuration information for the services at the UNI from the message. In these embodiments, the configuration information corresponds to a multipoint Ethernet Virtual Connection (EVC). The multipoint EVC can be a point-to-multipoint EVC or a multipoint-to-multipoint EVC. This method can be performed by a customer edge device coupled to the MEN at the UNI. Program instructions executable to implement this method can be stored on a computer readable medium. The configuration information can identify each of a plurality of locations of customer edge devices coupled by the multipoint EVC (e.g., by identifying each of the UNIs included in the multipoint EVC). If the multipoint EVC is a point-to-multipoint EVC, the configuration information can also identify whether each of the UNIs is a leaf UNI or a root UNI.

In some embodiments, a method can involve detecting a trigger condition and sending a message via a (User-to-Network Interface) UNI of a Metro Ethernet Network (MEN) in response to the trigger condition. The message includes configuration information, which corresponds to a multipoint Ethernet Virtual Connection (EVC). As noted above, the multipoint EVC can be a point-to-multipoint EVC or a multipoint-to-multipoint EVC. This method can be performed by a provider edge device within the MEN. Program instructions executable to implement this method can be stored on a computer readable medium.

Various embodiments of an apparatus include an Ethernet-Local Management Interface (E-LMI) protocol module. Such an apparatus can also include an interface coupled to the E-LMI protocol module. The interface is configured to communicate E-LMI protocol messages via a User-to-Network Interface (UNI) of a Metro Ethernet Network (MEN). For example, the interface can receive a message via the UNI, and the E-LMI protocol module can extract configuration information for the UNI from the message received by the interface. Similarly, the E-LMI protocol module can generate a message, encapsulate the message in an Ethernet frame, which includes a source address, and send the message to the interface.

The E-LMI protocol module can include a message handling module. The message handling module can generate an E-LMI protocol message and send the E-LMI protocol message to the interface. Alternatively (or additionally), the message handling module can parse an E-LMI protocol message received via the interface. The E-LMI protocol module can also include an error detection module.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
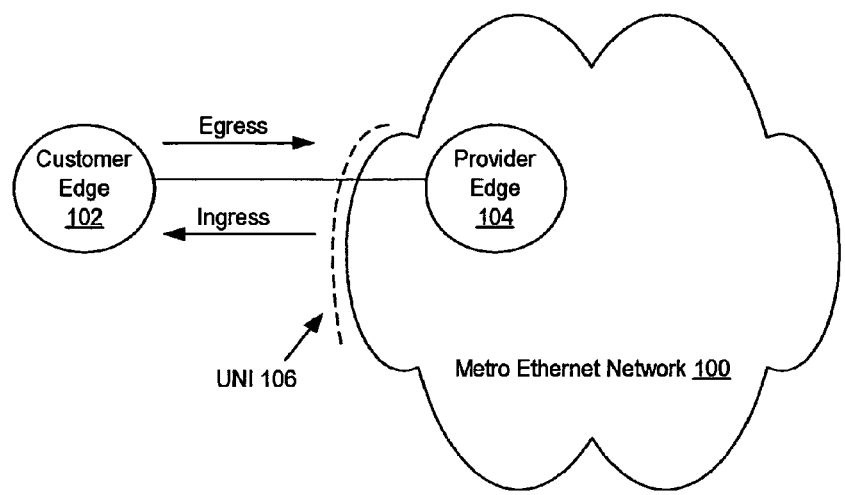
FIG. 1 shows how a customer edge device and a Metro Ethernet Network (MEN) use an E-LMI protocol to communicate configuration information, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates how a customer edge device (CE) connects to a provider edge device within a Metro Ethernet Network (MEN). As shown, customer edge (CE) device 102 is coupled to provider edge (PE) device 104. Provider edge device 104 is part of MEN 100. The point at which a customer edge device, such as customer edge device 102, connects to the service provider's MEN is referred to as a User-to-Network Interface, or UNI. In this example, customer edge device 102 is connected to MEN 100 at UNI 106.

In this example, UNI 106 is defined by customer edge device 102, which can be a router or a switch, on the customer's side of the UNI and provider edge device 104, which can also be a router or a switch, on the service provider's side of the UNI. It is noted that there is not always be a one-to-one correspondence between customer edge devices and provider edge devices. For example, a single customer edge device can connect to several provider edge devices within the MEN. Similarly, several different customer edge devices can connect to the same provider edge device.

Traffic sent across UNI 106 is described as being sent in an ingress or egress direction. As shown in FIG. 1, "ingress" and "egress" are defined relative to customer edge device 102. Traffic traveling in the egress direction is being sent from customer edge device 102 to MEN 100. Traffic traveling in the ingress direction is being sent to customer edge device 102 from MEN 100.

An Ethernet Local Management Interface (E-LMI) protocol runs at each UNI in MEN 100. By running the E-LMI protocol, provider edge device 104 within MEN 100 provides configuration and status information for the MEN to customer edge device 102. Customer edge device 102 then uses this configuration and status information to automatically configure itself for use with MEN 100. The status information for a MEN can include the status of each EVC currently configured on a particular UNI. The configuration information communicated across UNI 106 using the E-LMI protocol can include configuration information for various services provided by and characteristics of MEN 100 and/or each Ethernet Virtual Connection (EVC) implemented at the UNI. The E-LMI protocol can also be used by both customer edge device 102 and provider edge device 104 to verify whether the connection(s) between the customer edge device and the provider edge device are operational. For example, the exchange of messages according to E-LMI can be used to determine the status of the physical link between customer edge device 102 and provider edge device 104 as well as to verify the status of each EVC at UNI 106.

The use of the E-LMI protocol provides information about existing Ethernet services to the customer edge device attached to a UNI so that the customer edge device is able to automatically configure itself to access those Ethernet services. The E-LMI protocol can also provide the status of Ethernet services (such as the availability of various EVCs) to the customer edge device so that the customer edge device can take appropriate actions based on that status. For example, the E-LMI protocol can be used to inform the customer edge device as to which EVCs are currently active. The customer edge device uses this information to ensure that traffic is only routed through active EVCs.

Figure 2:
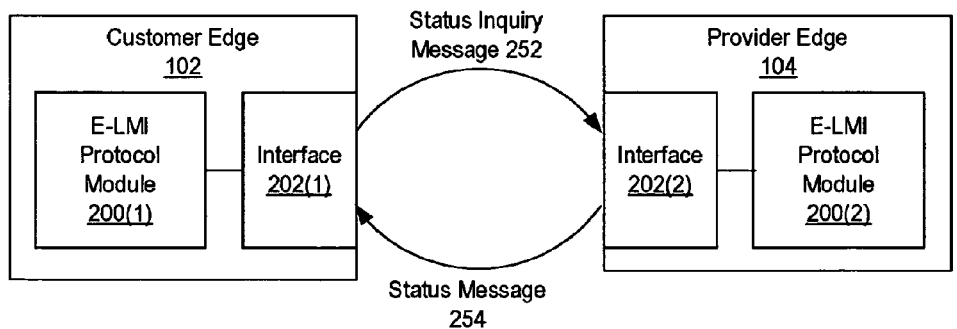
FIG. 2 shows a more detailed view of how the E-LMI protocol is used to communicate information across a UNI, according to one embodiment of the present invention.

FIG. 2 shows a more detailed view of how the E-LMI protocol is used to communicate information across a UNI. In this example, customer edge device 102 includes an E-LMI protocol module 200(1) and an interface 202(1). Provider edge device 104 similarly includes E-LMI protocol module 200(2) and interface 202(2). E-LMI protocol modules 200(1) and 200(2) are implemented in software executing on each device in one embodiment. In other embodiments, E-LMI protocol modules 200(1) and 200(2) are implemented in hardware (e.g., each module can be implemented in an ASIC) or in a combination of hardware and software.

E-LMI protocol module 200(1) and E-LMI protocol module 200(2) are each configured to initiate configuration and/or status information exchanges according to the E-LMI protocol. FIG. 2 shows two types of message that are used with the E-LMI protocol, in some embodiments of the present invention. In this embodiment, customer edge device 102 sends status inquiry message 252 in order to request various types of configuration information from the MEN. Provider edge device 104 sends status message 254 to provide various types of configuration and status information to customer edge device 102. Status message 254 is sent in response to a trigger condition (e.g., such as a change in configuration or status or receipt of a status inquiry message). For example, provider edge device 104 sends status message 254 in response to detecting that the service attributes values of the UNI and/or an EVC configured on the UNI have changed.

In some embodiments, E-LMI protocol module 200(1) is configured to generate and send status inquiry message 252 to the MEN via interface 202(1) in response to detecting that customer edge device 102 has powered up. For example, upon power up of customer edge device 102, E-LMI protocol module 200(1) sends status inquiry message 252 in order to request information indicating which EVCs are configured on UNI 106 as well as to verify that the link(s) between customer edge device 102 and MEN 100 are operational.

Provider edge device 104 receives status inquiry message 252 via interface 202(2). E-LMI protocol module 200(2) processes status inquiry message 252 in order to determine what configuration information (if any) is being requested. E-LMI protocol module 200(2) then generates and sends status message 254 to customer edge device 102 via interface 202(2). Status message 254 includes configuration and status information requested in status inquiry message 252.

In response to detecting the reception of status message 254 via interface 202(1), E-LMI protocol module 200(1) extracts configuration information from status message 254. E-LMI protocol module 200(1) then uses the extracted configuration information to automatically configure customer edge device 102. For example, if values of several parameters are received, E-LMI protocol module 200(1) saves these values into a configuration information store maintained by customer edge device 102. Information in the configuration information store is then used to control the operation of customer edge device 102 when customer edge device 102 is communicating with MEN 100.

Use of the E-LMI protocol provides E-LMI protocol module 200(1) with the ability to automatically configure customer edge device 102. Automatically configuring customer edge device 102 is significantly less time consuming and error prone than manually configuring customer edge device 102 would be. Accordingly, the use of the E-LMI protocol can reduce the cost and/or improve the efficiency of the configuration process.

Additionally, the ability to conduct automatic configuration information exchanges across a UNI allows a range of contingencies to be handled. For example, a customer may choose to replace an existing customer edge device. When the customer powers down the existing customer edge device, the Metro Ethernet services running at that customer edge device will no longer be available. The new customer edge device will need to be fully reconfigured for use with those services. In such a situation, upon power up, the new customer edge device automatically initiates a configuration information exchange using the E-LMI protocol. Accordingly, there is no need for a manual update. Additionally, service is restored more quickly than if the new customer edge device had to be manually configured.

The ability to conduct automatic configuration information exchanges across a UNI also allows customers to be able to quickly and easily take advantage of new services offered by the service provider. Whenever a new service is implemented within the MEN by the service provider (e.g., as a result of the service provider adding hardware to and/or upgrading software within the MEN), the provider edge device sends a status message, which includes information identifying the new service, to the customer edge device. This status message can be sent in response to the first status inquiry message sent by the customer edge device after the new service is implemented, or the status message can be sent "asynchronously" (i.e., the provider edge device can send the status message in response to detecting the new service, without first waiting for a status inquiry message). When the customer edge device receives the status message, the customer edge device updates the configuration of the customer edge device in order to be able to use the new service. Accordingly, the use of the E-LMI protocol allows almost immediate use of a new service, without the need for either the customer or the service provider to perform manual configuration.

The configuration information exchanged between the MEN and customer edge device 102 using the E-LMI protocol can include information indicating the ingress bandwidth profile at the UNI (e.g., committed information rate (CIR), peak information rate (PIR), committed burst size (CBS), and peak burst size (PBS). The configuration information can also include information indicating how Layer 2 (L2) control protocols are handled at the UNI or EVC (e.g., by indicating whether messages being sent as part of a particular L2 control protocol will be processed, discarded, or tunneled via an EVC). The configuration information can indicate the status, such as active or inactive, of the UNI (a UNI is "inactive" when no customer VLANs have been mapped to EVCs on the UNI). Other configuration information can include: the status, such as new, active, not active, and deleted, of each EVC configured on the UNI; an ingress bandwidth profile per EVC; Still other configuration information can include class of service (CoS) profiles and IDs. This information indicates what CoS IDs are used at the UNI, what class of service is associated with each CoS ID, and what bandwidth profile is associated with each CoS ID. By providing CoS profiles and IDs to customer edge device 102, customer edge device 102 is able to attach the appropriate CoS ID to each message being sent to MEN 100.

Figure 3:
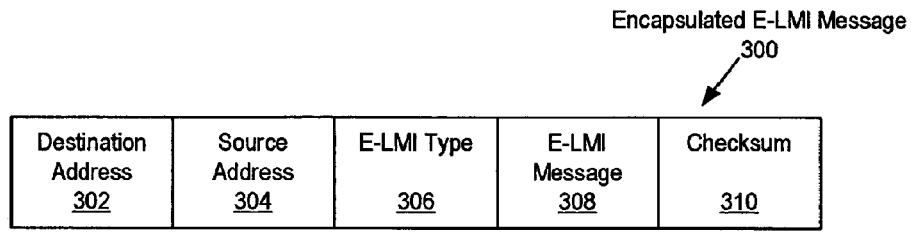
FIG. 3 illustrates how E-LMI messages are encapsulated within an Ethernet frame, according to one embodiment of the present invention.

In order to transfer E-LMI messages between the MEN and a customer edge device, the E-LMI messages are encapsulated. FIG. 3 illustrates how E-LMI messages are encapsulated within an Ethernet frame in one embodiment. In this embodiment, the E-LMI frame structure is based on the IEEE 802.3 basic untagged Media Access Control (MAC) frame format. It is noted that other embodiments encapsulate E-LMI messages differently. For example, in an alternative embodiment, E-LMI messages are encapsulated in Ethernet frames that are sent via a reserved VLAN. In yet another alternative embodiment, E-LMI messages are generated at the IP (Internet Protocol) layer, and each IP packet is then sent in one or more Ethernet frames.

As shown, encapsulated E-LMI message 300 includes destination address 302, source address 304, E-LMI type 306, E-LMI message 308, and checksum 310. It is noted that in other embodiments, other fields can be included in an E-LMI message in addition to and/or instead of those shown in FIG. 3.

In this example, destination address 302 has a value that identifies encapsulated E-LMI message 300 as a message that should not be forwarded by the device that receives the message. Each encapsulated E-LMI message includes the same value of destination address 302. This value can be unique to E-LMI protocol messages or used to identify messages in a variety of different protocols.

Source address 304 is the MAC address of the device (either the client edge device or provider edge device) that is sending encapsulated E-LMI message 300. E-LMI type 306 has a value that identifies encapsulated E-LMI message 300 as being an E-LMI message. In this example, E-LMI type 306 is an Ethernet type (or "Ethertype") field whose value identifies a particular type of message. The values of destination address 302 and E-LMI type 306 are used to differentiate encapsulated E-LMI messages from other types of encapsulated messages.

E-LMI message 308 contains the configuration information being sent according to the E-LMI protocol as well as other information specific to the E-LMI protocol. More details on the contents of E-LMI message 308 are provided with respect to FIG. 4.

Checksum 310 contains a value that is used to verify encapsulated E-LMI message 300. For example, checksum 310 can be a value generated by applying an error correction and/or error detection code to the remainder of encapsulated E-LMI message 300. When encapsulated E-LMI message 300 is received, the receiving device recalculates the checksum and compares the calculated value with the value included in the E-LMI message. Based on this comparison, the receiving device is able to detect and/or correct errors in the E-LMI message.

In some embodiments, in order to accommodate E-LMI messages that are shorter than the minimum payload of an Ethernet frame, devices that participate in the E-LMI protocol are configured to pad an Ethernet frame with additional octets if needed. For example, E-LMI protocol module 200(1) and E-LMI protocol module 200(2) of FIG. 2 can be configured to add additional octets (e.g., at the end of an E-LMI message) to an E-LMI message in order to generate a message having a size that is equal to the minimum payload of an Ethernet frame. In one embodiment, each bit in the additional octet(s) has a value of zero.

It is noted that the contents of encapsulated E-LMI message 300 differ from the contents of local management interface messages used in other environments. For example, in Frame Relay LMI, messages are encapsulated in variable length frames. A flag is used at the beginning and end of each frame that encapsulates a Frame Relay LMI message in order to delimit the beginning and end of the frame. Such flags are unnecessary (and thus not included) in encapsulated E-LMI message 300. Additionally, unlike encapsulated E-LMI message 300, frames that encapsulate Frame Relay LMI messages do not include source and destination addressing information.

Figure 4:
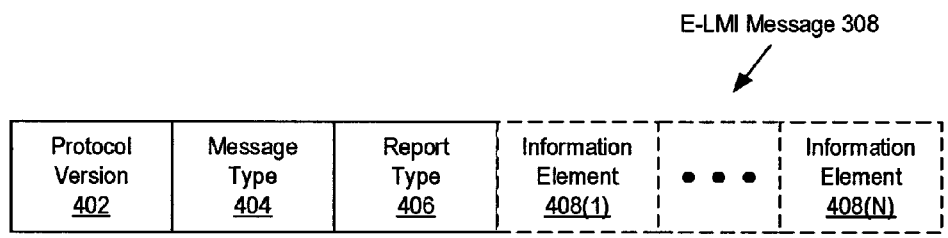
FIG. 4 shows the contents of an E-LMI message, according to one embodiment of the present invention.

FIG. 4 shows the contents of E-LMI message 308. In this example, E-LMI message 308 includes protocol version 402, message type 404, report type 406, and information element(s) 408(1)-408(N), which are collectively referred to as information elements 408. Information elements 408(1)-408(N) are optional, as represented by the dashed lines in FIG. 4. It is noted that in other embodiments, E-LMI message 308 can include other fields instead of and/or in addition to the fields illustrated in FIG. 4.

Protocol version 402 is a field that indicates the version of E-LMI supported by the customer edge or provider edge device that sent E-LMI message 308. In one embodiment, protocol version 402 is one octet long and is transmitted as the first octet in E-LMI message 308.

Message type 404 identifies the type of E-LMI message being sent. In some embodiments, there are two basic types of messages: status and status inquiry. A status message is a message sent from the MEN to a customer edge device via a UNI (e.g., as shown in FIG. 2). A status message includes information describing the attributes and status of the UNI and/or one or more EVCs configured on that UNI. A status inquiry message is a message sent from a customer edge device to the MEN (e.g., as shown in FIG. 2). A status inquiry message is used to request a status message. The value of message type 404 identifies E-LMI message 308 as either a status or a status inquiry message. In one embodiment, message type 404 is one octet long and is transmitted as the second octet in E-LMI message 308.

Report type 406 identifies a type of inquiry if message type 404 identifies a status inquiry message. If message type 404 identifies a status message, report type 406 identifies the type of configuration included in information elements 408. In one embodiment, report type 406 is three octets long and is transmitted as octets 3-6 in E-LMI message 308.

Information elements 408(1)-408(N) each identify a specific type of configuration and/or status information. In one embodiment, different types of information elements include "link integrity verification" information elements, "CE-VLAN ID/EVC map" information elements, "UNI ID/EVC map" information elements, "UNI" information elements, "EVC" information elements, "single EVC status" information elements, and/or "all EVC status" information elements. Typically, a particular type of information element is present only once in a given E-LMI message. In one embodiment, at least some types of information elements can each have a variable length. Examples of various different types of information elements are shown in FIGS. 6-12 and 16 in order to illustrate the different types of information that can be conveyed across the UNI using E-LMI. The sample information elements also show how different types of information are organized into different information elements in one embodiment of the present invention. It is noted that in other embodiments, information can be organized into information elements in a different manner than is illustrated in FIGS. 6-12 and 16. Additionally, other types of information elements can be used instead of and/or in addition to these types of information elements.

For a status message being conveyed across a given UNI, the status message will include at most one UNI information element, which is used to describe the status of that UNI. In contrast, there can be several different EVC information elements in the same status message. The status message can include one EVC information element for each EVC configured on the UNI. In one embodiment, the EVC information elements are arranged in ascending order of EVC reference IDs, such that the EVC with the lowest EVC reference ID is first, the second lowest EVC reference ID is second, and so on. The EVC reference IDs uniquely identify each EVC at the UNI. In one embodiment, EVC reference IDs are assigned to EVCs sequentially as EVCs are created (e.g., the first EVC to be created is assigned EVC reference ID "1", the second EVC to be created is assigned EVC reference ID "2", and so on).

In some embodiments, the particular types of information elements included in an E-LMI message varies depending on the type of message, as identified by the value of message type 404. If a status message is being sent in response to a status inquiry message, the contents of the status message correspond to the information requested in the status inquiry message. For example, if a provider edge device sends a status message in response to receiving a status inquiry message, the value of report type 406 of the status message will be the same as the value of report type 406 in the corresponding status inquiry message. The information elements included in the status message will correspond to the value of report type 406.

In some embodiments, the value of report type 406 identifies one of the following types of reports: "full status", "link integrity verification", "single EVC asynchronous status", "full status continued", and "all EVC asynchronous status" (it is noted that other types of reports can be used instead of and/or in addition to these reports in other embodiments). In such an embodiment, if message type 404 identifies a status message and if report type 406 identifies full status, the status message will include a link integrity verification information element, one or more CE-VLAN ID/EVC map information elements, a UNI information element, one or more EVC information elements, one or more UNI ID/EVC map information elements, and one or more single EVC status information elements. If report type 406 identifies link integrity verification, the status message will only include a link integrity verification information element. If report type 406 identifies full status continued, the status message includes a link integrity information element, one or more CE-VLAN ID/EVC map information elements, one or more EVC information elements, one or more UNI ID/EVC map information elements, and one or more single EVC status information elements. If report type 406 identifies single EVC asynchronous status, the status message only includes a single EVC status information element. If report type 406 identifies full EVC asynchronous status, the status message includes an all EVC status information element. The two asynchronous types of reports, single EVC asynchronous status and full EVC asynchronous status, are sent by the provider edge device in response to detecting a change in the status of an EVC and/or UNI (as opposed to being sent in response to receiving a status inquiry message).

If message type 404 identifies a status inquiry, report type 406 has one of three possible values: link integrity verification, full status continued, and full status. A status inquiry message is sent by a customer edge device to request one or more of the following: the status of the UNI, the status of all EVCs at the UNI, the UNI service attributes' parameters, the EVC service attributes' parameters, or to verify E-LMI link integrity. In one embodiment, a status inquiry message always includes a link integrity verification information element. If the provider edge device is operational, the provider edge device will always send a status message in response to receiving a status inquiry message.

The maximum number of information elements that can be included in a status message is limited by the Ethernet frame size in some embodiments. If all UNI and EVC information elements cannot be sent in a single Ethernet frame, the provider edge device will send one or more additional status messages containing the information elements that could not fit within the first Ethernet frame.

Figure 5:
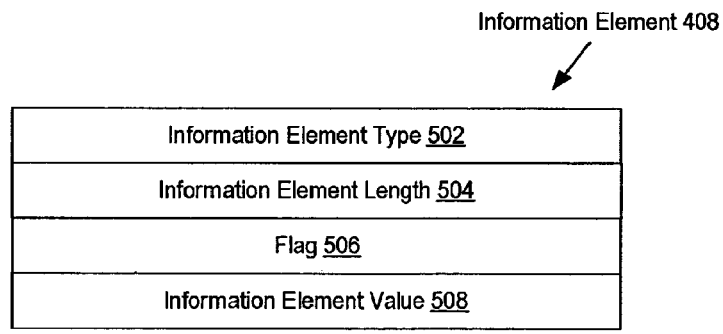
FIG. 5 illustrates the format of an E-LMI information element, according to one embodiment of the present invention.

FIG. 5 illustrates an example of an information element. In this example, information element 408 (which can represent any of information elements 408(1)-408(N) or report type 406 of FIG. 4) includes information element type 502, information element length 504, flag 506, and information element value 508. It is noted that in other embodiments, information element 408 can include other fields in addition to and/or instead of the fields illustrated in FIG. 5.

Information element type 502 has a value that identifies the type of information contained in information element 408. In some embodiments, report type 406 and information elements 408 each include information element type 502. The value of information element type 502 indicates the type of information included in the remainder of report type 406 or information element 408. In one embodiment, information element type 502 has one of the following values:

| Information Element Type Value | Type of Information |
| --- | --- |
| 01010001 | Report Type |
| 01010010 | Link integrity verification |
| 01010011 | CE-VLAN ID/EVC Map |
| 01010100 | UNI |
| 01010101 | EVC |
| 01010110 | UNI ID/EVC Map |
| 01010111 | Single EVC Status |
| 01011000 | All EVC Status |

In some embodiments, there is a specific order of appearance for each type of information element in a message. In one such embodiment, the code values of each information element type 502 are assigned in numerical order according to the actual order of appearance of each information element in a message. Using these code values allows a receiver to detect the presence or absence of a particular information element without scanning through the entire message. For example, using the above code values as an example, if a customer edge device receives a status message and wants to determine whether the status message includes an UNI information element, the customer edge device scans for an information element type 502 having a value of "01010100". If the customer edge device encounters an information element type 502 having a greater value before encountering "01010100", the customer edge device determines that the status message does not include a UNI information element.

Information element length 504 indicates the length of at least a portion of the information element. For example, in one embodiment, the value of information element length 504 identifies the length of information element 408, excluding information element type 502 and information element length 504. In one embodiment, the value of information element length 504 is the binary coding of the number of octets in information element 408, starting with the third octet. In some embodiments, the value of information element length 504 indicates the number of octets in information element value 508. Many information elements used with the E-LMI protocol are of variable length. In one embodiment, the report type and link integrity verification information elements have a fixed length, and thus in some embodiments information element length 504 can be excluded from these types of information elements.

In one embodiment, flag 506 is included in information elements that are capable of being subdivided into multiple information elements (each of which can be sent in a different E-LMI message) if the total size of that information element exceeds a maximum information element segment size. The value of flag 506 indicates whether the information element has been subdivided into multiple information element segments. The value of flag 506 can also indicate whether this particular information element segment is the final information element segment in the information element. For example, in one embodiment, flag 506 is a single bit. If the bit is cleared, the information element segment in which the bit is included is the last (or only one) information element segment. If the bit is set, the information element has been subdivided and the current information element segment is not the last information element segment within that information element.

When information element 408 contains spare (unused) bits (e.g., within a particular octet), these spare bits are set to a particular value (e.g., each spare bit can be set to zero). In some embodiments, sub-elements within information element 408 are encoded in groups of octets (i.e., each sub-element will span an integer number of octets). Within an octet group, a particular bit (e.g., bit 8) of each octet can be used as an extension bit. The value of the extension bit in a particular octet indicates whether that particular octet is the final octet in the octet group. For example, in one embodiment, if the extension bit is set to zero, the octet group continues to the next octet. If instead the extension bit of a particular octet is set to one, that octet is the last octet of the octet group.

Figure 6:
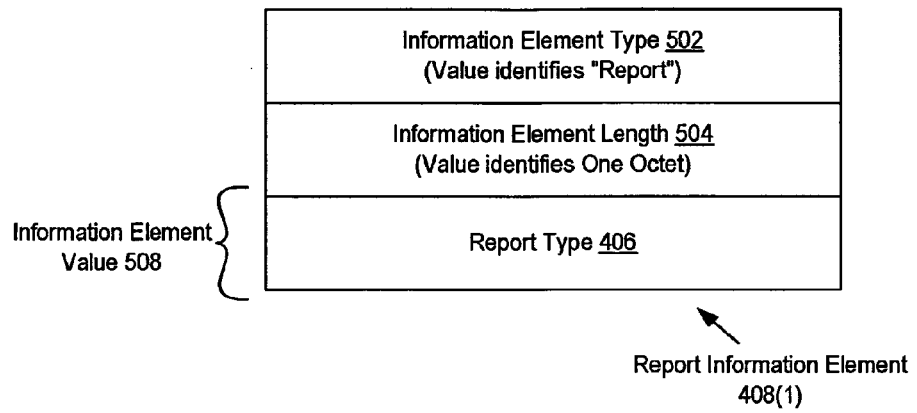
FIG. 6 shows an example of a report information element, according to one embodiment of the present invention.

FIG. 6 shows an example of a report information element 408(1). As shown, report information element 408(1) includes information element type 502, which has a value that identifies information element 408(1) as being a report information element. Report information element 408(1) also includes information element length 504, which has a value indicating that the length of the remainder of report information element 408(1). In this example, information element length 504 indicates the length of information element value 508. Information element value 508 is one octet in length in some embodiments. Information element value 508 includes report type 406. The value of report type 406 identifies the type of inquiry requested if report information element 408(1) is included in a status inquiry message. The value of report type 406 identifies the contents of a status message when report information element 408(1) is included in the status message. In one embodiment, the value of report type 406 identifies one of the following types of reports: "full status", "link integrity verification", "single EVC asynchronous status", "full status continued", and "all EVC asynchronous status".

The value of report type 406 is set to "full status" in status inquiry messages requesting full status of the UNI and the EVCs configured on the UNI as well as in status messages sent in response to such status inquiry messages. The value of report type 406 is set to "link integrity verification" in status inquiry messages that simply request link integrity verification and in status messages that are sent in response to such status inquiry messages.

The value of report type 406 is set to "single EVC asynchronous status" in status messages that are sent in response to a provider edge device detecting a change in status of a particular EVC. These status messages are not sent in response to status inquiries. Similarly, the value of report type 406 is set to "all EVC asynchronous status" in status messages that are sent in response to a provider edge device detecting a change in status of one or more EVCs configured at a UNI. A status message having a report type 406 specifying "all EVC asynchronous status" will include information indicating the status of each EVC configured on the UNI. "All EVC asynchronous status" status messages are also not sent in response to status inquiries.

The value of report type 406 is set to "full status continued" when a full status report will not fit within a single Ethernet frame (e.g., due to the number of EVCs configured on the UNI). A report type of this value can be included in both status inquiry messages and status messages. If a status message has this report type, the "full status continued" report type indicates that the status report has been segmented into a set of more than one status messages and that this status message is not the last message in the set (the last status message into which the status report has been segmented has a report type value indicating "full status"). In response to receiving a status message in which the report type indicates "full status continued", a customer edge device will send a status inquiry message specifying "full status continued" in the status inquiry message's report type. This status inquiry message requests the next status message into which the full status report has been segmented. In response to receiving subsequent "full status continued" status message, the customer edge device continues sending status inquiries that specify "full status continued" until the customer edge device receives a status message specifying a "full status" report.

Figure 7:
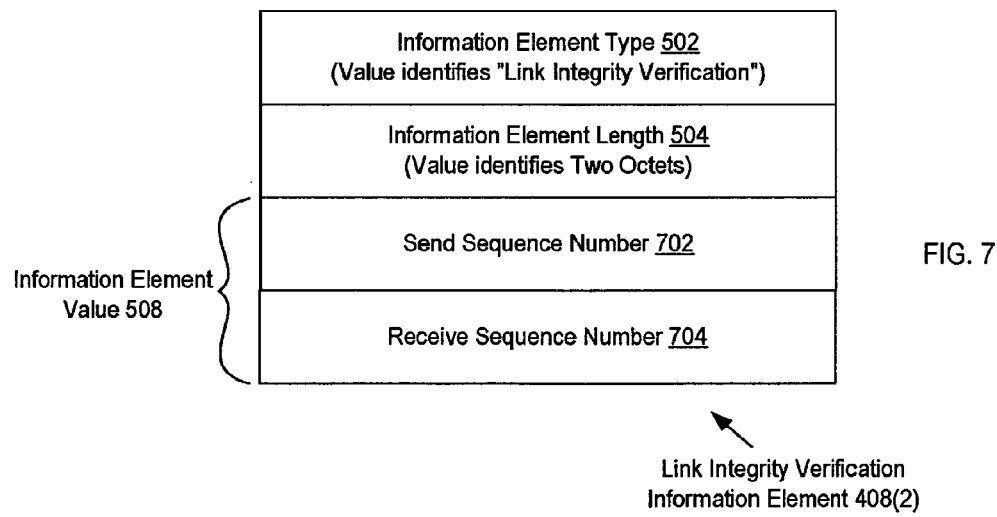
FIG. 7 shows an example of a link integrity verification information element, according to one embodiment of the present invention.

FIG. 7 shows an example of a link integrity verification information element 408(2). Link integrity verification information element 408(2) includes information element type 502, which has a value that identifies information element 408(2) as being a link integrity verification information element. Link integrity verification information element 408(2) includes information that is used to verify the operation of the link(s) coupling a customer edge device to a MEN. For example, in one embodiment, link integrity verification information elements are used to exchange sequence numbers (such as send sequence number 702 and receive sequence number 704 of FIG. 7) between the MEN and a customer edge device on a periodic basis. If no message containing a "link integrity verification" information element is received within a given period, or if a received "link integrity verification" information element having an incorrect sequence number is received, the receiving device (or the device that expected to receive such an information element) will detect an error.

Information element length 504 within link integrity verification information element 408(2) indicates the length of information element value 508. In one embodiment, the length of link integrity verification information element 408

(2) is always four octets. The first octet includes information element type 502. The second octet includes information element length 504, which indicates the length (two octets in FIG. 7) of the remainder of the link integrity verification information element. Send sequence number 702 is included in the third octet. The value of send sequence number 702 indicates the current send sequence number of the sending device (i.e., the customer edge or provider edge device that is sending this link integrity verification information element). Receive sequence number 704 is included in the fourth octet. Receive sequence number 704 includes the send sequence number that was included in the last link integrity verification information element received by the sending device. The values of send sequence number 702 and receive sequence number 704 are binary encoded in one embodiment.

Figure 8:
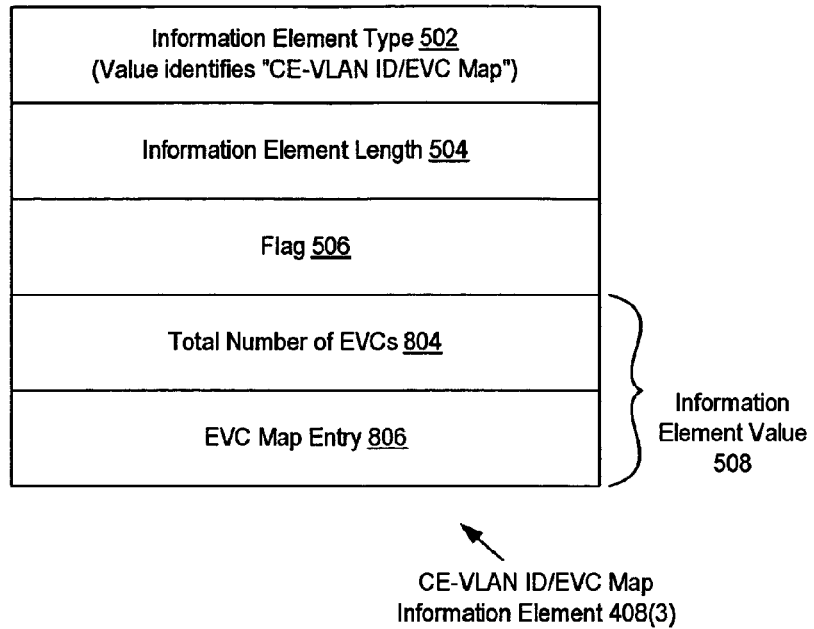
FIG. 8 illustrates an example of a CE-VLAN ID/EVC map information element, according to one embodiment of the present invention.

FIG. 8 illustrates an example of a CE-VLAN ID/EVC map information element 408(3). CE-VLAN ID/EVC map information element 408(3) identifies how the VLAN identifiers (IDs) used by the customer edge device are mapped to specific EVCs within the MEN. The VLAN IDs used by the customer edge device are referred to as "CE-VLAN IDs" in order to distinguish the customer's VLAN IDs from any VLAN IDs used within the MEN.

CE-VLAN ID/EVC map information element 408(3) includes information element type 502, which identifies that the information element is a CE-VLAN ID/EVC map information element, information element length 504, flag 506, and information element value 508. The value of information element length indicates the length of information element value 508. Flag 506 indicates whether CE-VLAN ID/EVC map information element is the last (or only) one of a set of one or more information element segments. In one embodiment, the maximum length of a CE-VLAN ID/EVC map information element is 20,723 octets. A CE-VLAN ID/EVC map information element of this size is generated if 4094 EVCs are configured on the UNI and each CE-VLAN ID is mapped to an EVC Reference ID using an EVC map entry field. If the maximum size of an Ethernet frame is 1500 octets, at least 14 Ethernet frames will be needed to convey all of a CE-VLAN ID/EVC map of this size (without taking into account additional frames needed to convey any overhead and/or other information elements).

Information element value 508 includes total number of EVCs 804 and EVC map entry 806. Total number of EVCs 804 identifies how many EVCs are configured on the UNI. If the CE-VLAN ID/EVC Map information element 408(3) is one of several segments, this field is sent in the first CE-VLAN ID/EVC map segment and is not repeated in subsequent CE-VLAN ID/EVC map segments.

EVC map entry 806 contains information mapping a customer VLAN ID to a specific EVC reference ID, which identifies a particular one of the EVCs configured on the UNI. EVC map entry 806 includes an EVC reference ID and a VLAN ID of a customer VLAN that maps to the identified EVC. Messages being conveyed in that customer VLAN will be conveyed in the identified EVC within the MEN.

EVC map entry 806 is repeated inside the CE-VLAN ID/EVC Map information element 408(3) for each different EVC to which a CE-VLAN is mapped. This field can also be segmented and sent in multiple CE-VLAN ID/EVC map information element 408(3) segments. A bit within each EVC map entry 806 segment indicates whether that segment is the last (or only) EVC map entry 806 segment within the EVC map entry.

EVC map entry 806 can include a "default EVC" flag (not shown). If, for example, the "default EVC" flag is set to one, it indicates that all CE-VLAN IDs that are not specifically addressed in other EVC map entries are mapped to the EVC Reference ID included in EVC map entry 806. No more than one EVC can be identified as a default EVC on the UNI. EVC map entry 806 can also include an "untagged/priority tagged" flag (not shown). If the "untagged/priority tagged" flag is set to one, EVC map entry 806 identifies the EVC reference ID of the EVC used for untagged/priority tagged service frames.

Multiple CE-VLAN IDs can map to the same EVC. In one embodiment, EVC map entry 806 includes an extension flag (not shown) for each CE-VLAN ID included within EVC map entry 806. If the extension flag is set to one, more than one CE-VLAN ID maps to the EVC identified in EVC map entry 806 and the CE-VLAN ID associated with the extension flag is not the last CE-VLAN ID. If the extension flag is set to zero, the associated CE-VLAN ID is the last (or only) CE-VLAN ID that maps to the EVC identified in EVC map entry 806. Alternatively, each CE-VLAN ID/EVC map information element includes a value that identifies the number of EVC map entries 806 included within that information element. For example, in one embodiment, a value indicates the total number of EVC map entries within the CE-VLAN ID/EVC map information element. As yet another alternative (or in addition to the use of the value indicating the total number of EVC map entries), each EVC map entry 806 includes a value indicating the number of EVC map entries up to and including that EVC map entry (e.g., the first EVC map entry includes value "1", the second EVC map entry includes value "2", and so on).

The number of bytes needed to carry CE-VLAN ID/EVC map information element 408(3) depends on the number of EVCs provisioned at the UNI. For example, in one embodiment, if 4094 EVCs are configured at a particular UNI, the length of the CE-VLAN ID/EVC Map information element for that UNI will have more than 20,000 octets. When the number of octets in an information element exceeds 255, this information element is subdivided into multiple segments. If the size of the information element would otherwise cause the size of the E-LMI message to exceed the maximum size for E-LMI messages, at least some of the segments are carried in different E-LMI messages. As noted above, the value of flag 506 indicates whether the particular CE-VLAN ID/EVC map information element 408(3) is the last (or only) one of one or more information element segments.

Figure 9:
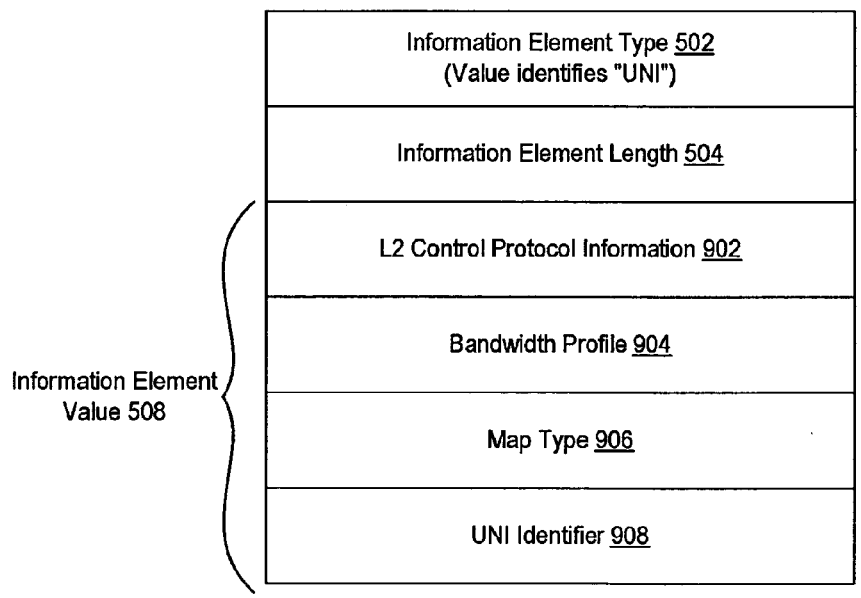
FIG. 9 illustrates an example of a UNI information element, according to one embodiment of the present invention.

FIG. 9 illustrates an example of a UNI information element 408(4). A UNI information element is used to convey the status of and other relevant UNI service attributes of the UNI. As shown, UNI information element 408(4) includes information element type 502, information element length 504, and information element value 508. The value of information element type 502 indicates that information element 408(4) is a UNI information element. Information element length 504 identifies the length of information element value 508.

In this example, information element value 508 includes L2 control protocol information 902, bandwidth profile 904, map type 906, and UNI identifier 908. L2 control protocol information 902 identifies an L2 control protocol. L2 control protocol information 902 also indicates whether the provider edge device participates in that L2 control protocol or simply passes messages sent as part of that L2 control protocol to the EVC. If a particular L2 control protocol has not been identified in a UNI information element, the provider edge device will discard messages sent as part of that L2 control protocol. Accordingly, if no L2 control protocols are identified in the UNI information element, all L2 control protocol messages will be discarded as those messages enter the MEN. UNI information element 408(4) can include several different L2 control protocol information fields (e.g., UNI information element 408(4) can include between zero and N L2 control protocol information fields, where N is the number of L2 control protocol running on the customer edge device).

Bandwidth profile 904 indicates the bandwidth profile of the UNI. Bandwidth profile 904 can include information indicating the committed information rate (CIR), which is the long term average bandwidth for traffic that will be delivered by the MEN according to a specified performance commitment (e.g., a commitment to a maximum amount of delay or loss). The committed bust size (CBS) is the size of traffic burst that will be delivered by the MEN according to a specified performance commitment. Bandwidth profile 904 can also (or alternatively) include the excess information rate (EIR) and/or excess burst size (EBS). Traffic that exceeds either EIR or EBS is discarded by the MEN.

The value of map type 906 identifies one of several different types of CE-VLAN ID-to-EVC maps, such as all-to-one bundling (this is a map in which all CE VLAN IDs are mapped to the same EVC), service multiplexing with no bundling (this is a map in which there is a one-to-one correspondence between CE VLAN IDs and EVCs), untagged service frames only (indicating that messages tagged with customer VLAN IDs are not conveyed via the UNI), and general bundling (this is a map in which different CE VLAN IDs are mapped to different EVCs). If map type 906 identifies all-to-one bundling or untagged service frames only, only one EVC is defined at the UNI.

UNI identifier 908 includes a value that identifies the UNI. In one embodiment, UNI identifier 908 is an ASCII string between 1 and 64 octets. The value of the string is chosen to identify the location of the customer edge device coupled to the network by the UNI. For example, the string can be "Fourth floor router, ABCD Engineering Division Building, Miami, Fla.".

Figure 10:
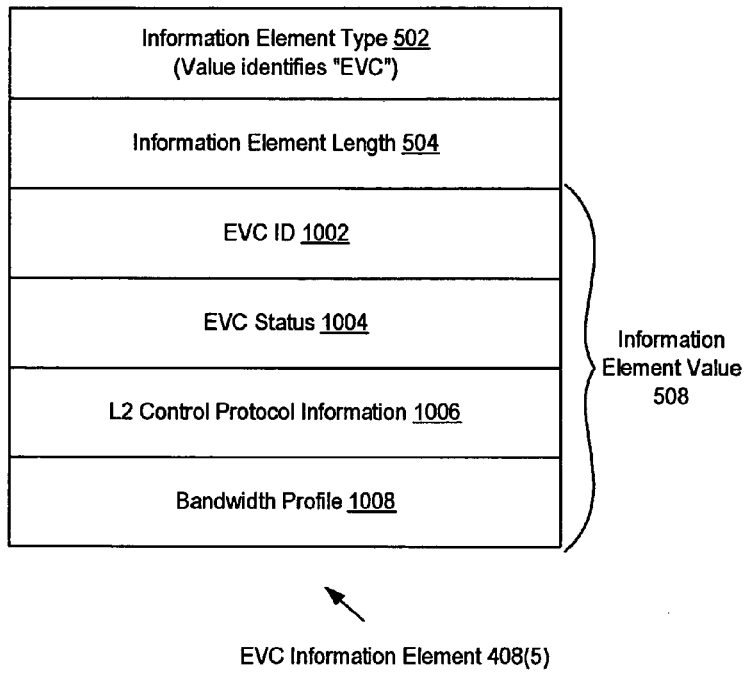
FIG. 10 shows an example of an EVC information element, according to one embodiment of the present invention.

FIG. 10 shows an example of an EVC information element 408(5). As shown, EVC information element 408(5) includes information element type 502, information element length 504, and information element value 508. The value of information element type 502 indicates that information element 408(5) is an EVC information element. The value of information element length indicates the length of information element value 508. In one embodiment, the maximum length of EVC information element 408(5) is 107 octets.

EVC information element 408(5) is used to convey the status and other service attributes of an existing EVC on the UNI. The EVC information element can be repeated, as necessary, in a status message (e.g., the EVC information element can be repeated once per EVC configured on the UNI).

In EVC information element 408(5), information element value 508 includes EVC reference ID 1002, EVC status 1004, L2 control protocol information 1006, and bandwidth profile 1008. EVC reference ID 1002 identifies one of the EVCs configured on the UNI. The remainder of the information included in information element value 508 relates to the EVC identified in EVC reference ID 1002. EVC status 1004 identifies the status of the EVC identified in EVC reference ID 1002. In one embodiment, the status of an EVC includes one or more of: deleted, active, partially active, and new. If the EVC has been deleted, the EVC is no longer capable of conveying frames. A new EVC is an EVC that has just been provisioned. An active EVC can convey frames. An EVC can be both new and active at the same time. If the EVC includes more than two UNIs (e.g., if the EVC is a point-to-multipoint or multipoint-to-multipoint EVC), the partially active state is used to indicate that some but not all of the UNIs in that EVC are working.

Having a status of "new" allows the provider edge device to notify the customer edge device of new EVCs that have been added on the UNI. When a new EVC is added on the UNI, the provider edge device will set the status of that EVC to "new" in the next "full status" status message sent after the addition of the EVC. The provider edge device will continue to set the status of that EVC to "new" in subsequent status messages until the provider edge device receives a status inquiry that contains a receive sequence number equal to the value of the provider edge device's send sequence counter. When the customer edge device receives a "full status" message containing an EVC information element in which the status of the EVC is "new", the customer edge device will do one of the following: if the customer edge device already has the EVC (with the same EVC reference ID) in the customer edge device's list of configured EVCs, the customer edge device will delete the EVC from the list; otherwise, the customer edge device will add the EVC to the list of configured EVCs.

The customer edge device determines whether a particular EVC is configured on the UNI by searching a full status message for an information element corresponding to that EVC. In one embodiment, if a customer edge device receives a status message that omits an EVC that was identified in a previously received status message, the customer edge device interprets the omission of the previously reported EVC from the status message as an indication that the EVC is no longer provisioned on the UNI.

L2 control protocol information 1006 indicates how a particular type of L2 control protocol messages will be handled within the EVC. For example, L2 control protocol information 1006 includes information identifying an L2 control protocol as well as information identifying whether messages being sent as part of that L2 control protocol should be conveyed via the EVC (e.g., in a logical tunnel) or discarded before entering the EVC. Like a UNI information element 408(4), an EVC information element 408(5) can include multiple L2 control protocol information fields 1006.

Bandwidth profile 1008 indicates the bandwidth profile of the EVC at the UNI. Like the bandwidth profile field in UNI information element 408(4), bandwidth profile 1008 can include information identifying the CIR, CBS, EIR, and/or EBS. Bandwidth profile 1008 can also include a specific priority flag. If a priority flag is included in bandwidth profile 1008, the bandwidth profile will only be applied to frames that include the priority marking indicated by the priority flag (as opposed to being applied to all frames within the EVC).

Figure 11:
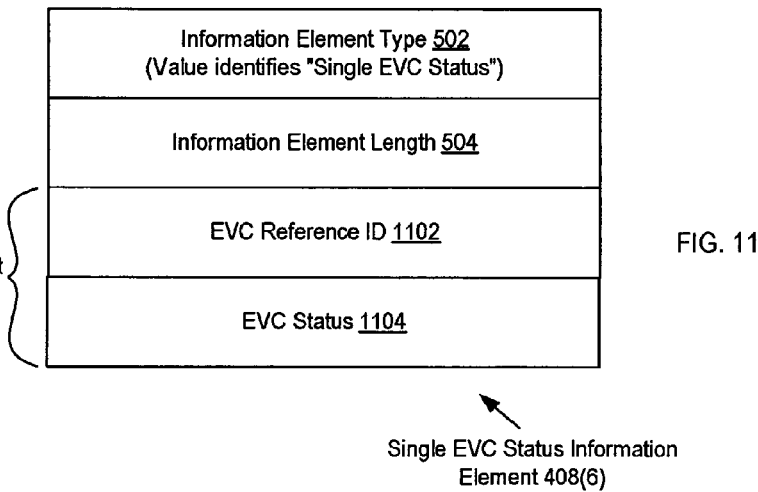
FIG. 11 shows an example of a single EVC status information element, according to one embodiment of the present invention.

FIG. 11 shows an example of a single EVC status information element 408(6). The purpose of single EVC status information element 408(6) is to convey the status of a specific EVC. This information element can be repeated in a single status message for different EVCs. In one embodiment, the length of this information element is four octets.

As shown in FIG. 11, single EVC status information element 408(6) includes information element type 502, information element length 504, and information element value 508. Information element type 502 indicates that information element 408(6) is a single EVC status information element. Information element length 504 identifies the length of information element value 508.

Information element value 508 includes EVC reference ID 1102 and EVC status 1104. EVC reference ID 1102 contains information identifying one of the EVCs that is configured at the UNI. EVC status 1104 contains information identifying the status of the EVC identified in EVC reference ID 1102. The status of the EVC can be: deleted, active, new, or partially active, as described above. In some embodiments, EVC status 1104 is used to identify one of several different "partially active" states. For example, the status can indicate that a remote UNI (i.e., a UNI other than the UNI via which the information element is being conveyed) within the EVC is disconnected, a remote UNI within the EVC has experienced too many bit-errors, a remote UNI within the EVC only has one-way communication with the MEN, or a remote UNI within the EVC is not reachable. In one embodiment, the status also indicates whether the affected remote UNI is a root or leaf UNI within a multipoint (i.e., point-to-multipoint or multipoint-to-multipoint) EVC. Also, in some embodiments, the affected remote UNI is identified (e.g., by specifying the UNI reference ID or UNI identifier of the affected remote UNI). In embodiments where the maximum length of the status message is 1500 octets and where the maximum length of single EVC status information element 408(6) is four octets, a provider edge device can include the EVC status of up to 248 EVCs in a single asynchronous status message. If the status of more than 248 EVCs needs to be reported, the provider edge device will send additional asynchronous status messages.

Figure 12:
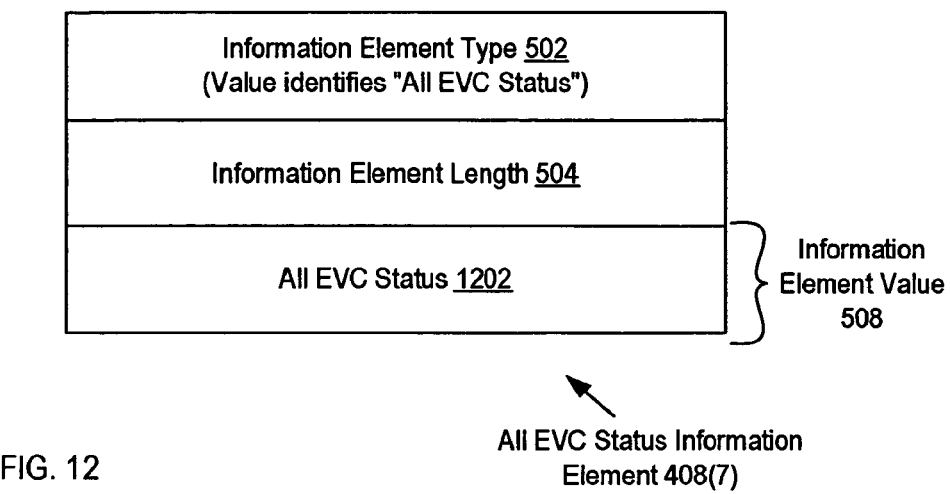
FIG. 12 illustrates an example of an all EVC status information element, according to one embodiment of the present invention.

FIG. 12 illustrates an example of an all EVC status information element 408(7). The purpose of all EVC status information element 408(7) is to convey the status of all EVCs configured at the UNI. This information element cannot be repeated in a single status message. In one embodiment, the length of this information element is three octets.

As shown, all EVC status information element 408(7) includes information element type 502, which identifies information 408(7) as an all EVC status information element, information element length 504, which indicates the length of information element value 508, and information element value 508. Information element value includes all EVC status 1202. When all EVC status information element 408(7) is conveyed in a status message, all EVC status 1202 carries status information for all EVCs. All EVC status 1202 indicates whether all EVCs configured at the UNI are active, inactive, or deleted.

Figure 13:
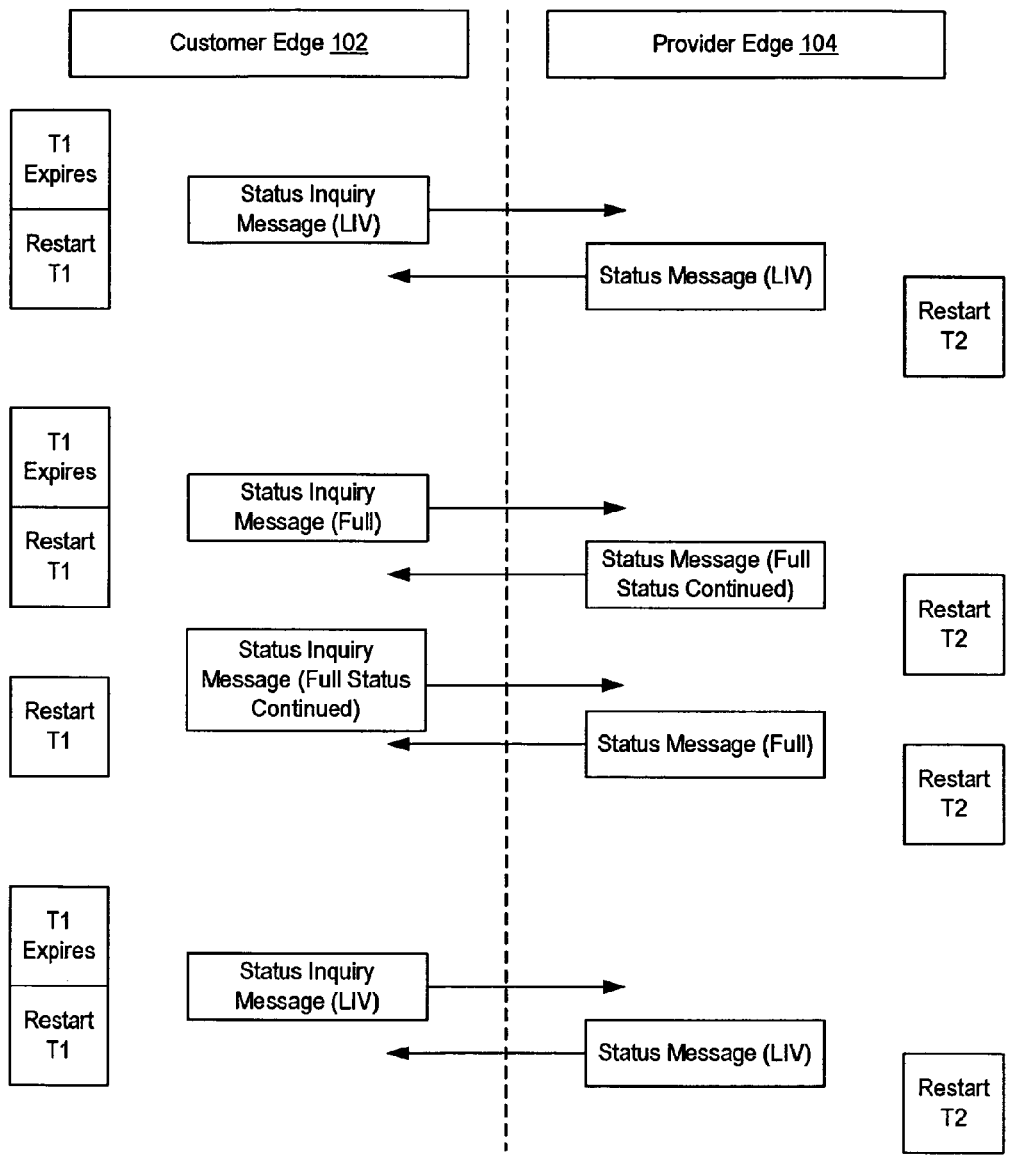
FIG. 13 illustrates an example of an exchange of E-LMI protocol messages between customer edge device and provider edge device via a UNI, according to one embodiment of the present invention.

FIG. 13 illustrates an example of an exchange of E-LMI protocol messages between customer edge device 102 and provider edge device 104 via a UNI. In this example, messages shown at the top of the figure are sent earlier in time than messages shown closer to the bottom of the figure.

Customer edge device 102 sends status inquiry messages in response to a timer T1. When T1 expires, customer edge device 102 sends a status inquiry message via the UNI. In this example, the first status inquiry message sent by customer edge device 102 specifies link integrity verification (LIV). Customer edge device 102 restarts time T1 in response to sending the status inquiry message.

In one embodiment, T1 is started in response to customer edge device 102 sending a status inquiry message. If T1 expires before a status message is received, customer edge device 102 will record an error. In one embodiment, T1 is capable of being set to any value in the range of 5-30 seconds. T1 has a default value of 10 seconds in one embodiment. Other timer values are used in other embodiments.

In response to receiving this status inquiry message, provider edge device 104 sends a status message that includes a link integrity verification (LIV) information element. Upon sending this status message, provider edge device 104 restarts timer T2.

In one embodiment, T2 is started in response to provider edge device 104 sending a status message via the UNI. T2 is started in response to any status message, regardless of whether the status message was requested by a status inquiry message or not. T2 is stopped in response to provider edge device 104 receiving a status inquiry message via the UNI (in this example, the situations in which T2 is stopped are not shown). If T2 expires before a status inquiry message is received, provider edge device 104 records an error and restarts T2. In one embodiment, T2 is set to a value in the range of 5-30 seconds. T2 has a default value of 15 seconds in one embodiment. The value of T2 is greater than the value of T1.

As shown in FIG. 13, customer edge device 102 sends a second status inquiry message the second time T1 expires. The second status inquiry message sent by customer edge device 102 requests full status ("full"), and customer edge device 102 restarts timer T1 in response to sending this status inquiry message. In one embodiment, every Nth status inquiry sent by customer edge device 102 (excluding status inquiries with report types of "full status continued") is a request for full status. Each other status inquiry (again, excluding status inquiries within report types of "full status continued") is a request for link integrity verification. In such embodiments, customer edge device 102 maintains a polling counter. The polling counter is incremented each time customer edge device 102 sends a status inquiry message specifying only link integrity verification (as opposed to specifying full status and link integrity verification). Each time the polling counter reaches a particular value (e.g., six), customer edge device 102 sends a status inquiry message requesting full status. The polling counter is reset in response to sending the status inquiry message requesting full status.

In response to receiving the status inquiry specifying full status, provider edge device 104 generates a full status report. In this example, the size of the full status report (which can include a CE-VLAN ID/EVC map information element, UNI information element, UNI ID/EVC map information element, single EVC status information element, and an EVC information element for each EVC configured on the UNI) exceeds the size of an Ethernet frame. Here, provider edge device 104 segments the full status report into two segments. As shown, provider edge device 104 sends the first segment of the full status report in a first "full status continued" status message. In one embodiment, provider edge device 104 includes as many segments of the CE-VLAN ID/EVC map information element and/or as many EVC information elements as possible into the first status message. Provider edge device 104 restarts timer T2 in response to sending the first "full status continued" status message.

In response to receiving the "full status continued" status message, customer edge device 102 extracts the configuration information from the information elements in that status message. Additionally, since the report type of the status message indicates "full status continued", customer edge device 102 requests the next segment of the full status report by sending a status inquiry message in which the report type is set to "full status continued". Customer edge device 102 restarts T1 in response to sending the "full status continued" status inquiry message.

Provider edge device 104 responds to the "full status continued" status inquiry message by sending a second status message. Since this status message contains the final segment of the full status report, the report type of this status message is set to "full status". Provider edge device 104 restarts timer T2 in response to sending the "full status" status message. The information elements in the second "full status continued" status message begin with the next CE-VLAN ID/EVC map information element segments and/or the next EVC information elements following the information element segments and/or information elements in the previous status message.

When customer edge device receives the "full status" status message, customer edge device 102 determines that all configuration information has been sent. Customer edge device 102 extracts the configuration information from the "full status" status message. As shown, customer edge device 102 then sends another link integrity verification status inquiry the next time that timer T1 expires.

Figure 14:
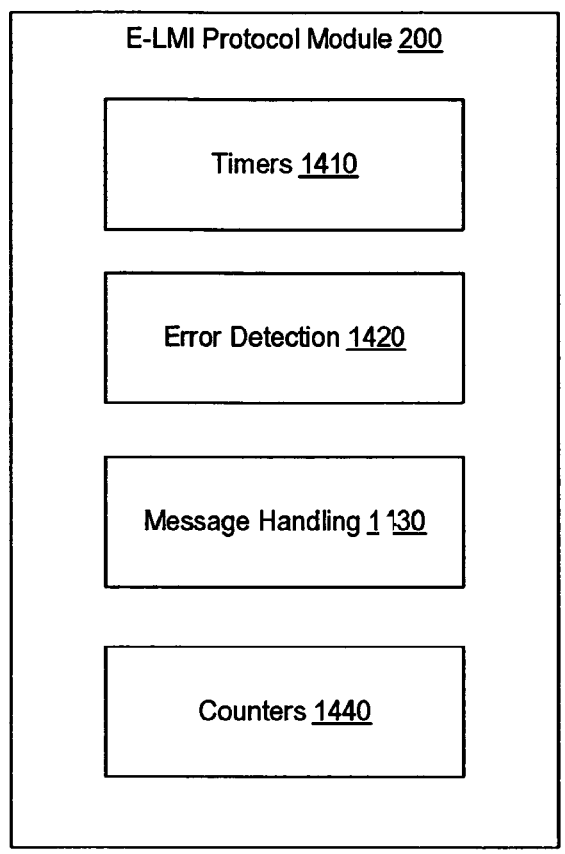
FIG. 14 shows an example of the functionality that is included in an E-LMI protocol module, according to one embodiment of the present invention.

FIG. 14 shows an example of the functionality that is included in an E-LMI protocol module 200 in one embodiment. E-LMI protocol module 200 can represent either E-LMI protocol module 200(1) or E-LMI protocol module 200(2) of FIG. 2. As shown, E-LMI protocol module 200 includes one or more timers 1410, error detection module 1420, message handling module 1430, and/or counters 1440.

If E-LMI protocol module 200 is being used in provider edge device 104, timers 1410 include timer T2 (as described above with respect to FIG. 13). If E-LMI protocol module 200 is being used in customer edge device 102, timers 1410 include timer T1.

Counters 1440 include various counters used by other modules within E-LMI protocol module 200. For example, counters 1440 can include a polling counter used by a message handling module 1430 in a customer edge device to determine how often to send a full status inquiry message. Similarly, counters 1440 can include one or more error counters as well as various sequence number counters, such as a send sequence counter and a receive sequence counter, for use in both message generation and error detection.

Error detection module 1420 detects E-LMI link reliability errors (e.g., the failure to receive status or status inquiry messages or the detection of invalid sequence numbers in a link integrity verification information element) and protocol errors (e.g., errors within an E-LMI message). For example, error detection module 1420 accesses a send sequence counter and a receive sequence counter in counters 1440 for use in link integrity verification. The send sequence counter maintains the value of the send sequence number field of the last link integrity verification information element sent by E-LMI protocol module 200. The receive sequence counter maintains the value of the send sequence number field in the last link integrity verification information element received by E-LMI protocol module 200. The value of the receive sequence counter is the value that will be placed in the next received sequence number field sent by E-LMI protocol module 200.

If E-LMI protocol module 200 is part of customer edge device 102, the send sequence counter will be incremented each time customer edge device 102 sends a status inquiry message. E-LMI protocol module 200 will include the current value of the send sequence counter in the send sequence number field of each status inquiry message. E-LMI protocol module 200 will also place the current value of the receive sequence counter into the receive sequence number field of each link integrity verification information element sent by customer edge device 200. When the customer edge device receives a status message in response to a status inquiry message, error detection module 1420 checks the receive sequence number in the status message against the current value of the send sequence counter. If the values do not match, error detection module 1420 detects an error condition. In response to detecting an incorrect sequence number in a link integrity verification information element, E-LMI protocol module 200 increments an error counter. If no error is detected, the send sequence number in the received status message is stored in the receive sequence counter.

If E-LMI protocol module 200 is part of provider edge device 104, error detection module 1420 will check each receive sequence number included in a status inquiry received from the customer edge device against the current value of the provider edge device's send sequence counter. If the values do not match, error detection module 1420 detects an error. In response to detecting an incorrect sequence number in a link integrity verification information element, E-LMI protocol module 200 increments an error counter. If no error is detected, error detection module 1420 stores the received send sequence number in the receive sequence counter. Error detection module 1420 then increments the send sequence counter. E-LMI protocol module 200 then sends a status message in response to the status inquiry. E-LMI protocol module 200 places the current value of the send sequence counter in the send sequence number field and the value of the receive sequence counter into the receive sequence number field of the outgoing status message.

As noted above, error detection module 1420 can also include functionality to detect protocol errors. For example, error detection module 1420 can detect a protocol version error if an E-LMI message identifying an invalid protocol version (e.g., in protocol version field 402 of FIG. 2) is received. The receiving customer or provider edge device will ignore such a message. When a message is ignored, no action will be taken on the message and no state change will occur in response to receiving the message. In some embodiments, error detection module 1420 also increments an error counter in response to receiving a message with an invalid protocol version.

Error detection module 1420 can also detect invalid values within an E-LMI message or information element. If a message or information element that includes an invalid value is received, that message or information element will be ignored. An ignored information element will not be processed and no action will be taken based on the information contained in the ignored information element. In one embodiment, if error detection module 1420 detects an information element that has invalid content, E-LMI protocol module 200 will ignore the entire message in which that information element is included.

In one embodiment, error detection module 1420 detects a variety of different errors within information elements. For example, error detection module 1420 detects an EVC information element that specifies an EVC reference ID that is not recognized as identifying a configured Ethernet Virtual Connection. As another example, error detection module 1420 detects whether a variable-length information element has a code value lower than the code value of a preceding information element. If the code value is lower than the code value of the preceding information element, that information element will be treated as an out-of-sequence information element. If error detection module 1420 detects an E-LMI message containing an out-of-sequence information element, E-LMI protocol module 200 can ignores that information element and continues to process the message. In some embodiments, error detection module 1420 will also cause E-LMI protocol module 200 to ignore an information element with a length exceeding the maximum length for that type of information element.

Error detection module 1420 detects an error if an information element or field is repeated in an E-LMI message in which repetition of the information element or field is not permitted. If such an error is detected, E-LMI protocol module 200 will only consider the contents of the first instance of the information element (all subsequent instances will be ignored). When a message that is missing one or more mandatory information elements is received, the message will be ignored.

In some embodiments, error detection module 1420 will not increment an error counter in response to an E-LMI message that includes an invalid value. This avoids double-counting of errors. For example, if error detection module 1420 were to count an error a first time when receiving an invalid message and a second time in response to failing to receive a status or status inquiry message, error detection module 1420 may have counted the same error twice, inflating the error count.

Message handling module 1430 generates and parses E-LMI messages. If E-LMI protocol module 200 is part of customer edge device 102, message handling module 1430 also extracts configuration information from an E-LMI message and use that extracted configuration information to automatically configure customer edge device 102.

It is noted that the program instructions executable to implement E-LMI protocol module 200 can be stored on various computer readable media such as a memory (e.g., RAM (Random Access Memory)). For example, in FIG. 2, customer edge device 102 and provider edge device 104 can each include software and data configured to implement a respective E-LMI protocol module 200(1) or 200(2). In some embodiments, such software is stored on a computer readable medium such as a CD (Compact Disc), DVD (Digital Versatile Disc), hard disk, optical disk, tape device, floppy disk, and the like). In order be executed, the software is loaded into memory from another computer readable medium. The instructions and/or data can also be transferred to a computing device for storage in memory via a network such as the Internet or upon a carrier medium. In some embodiments, a computer readable medium is a carrier medium such as a network and/or a wireless link upon which signals such as electrical, electromagnetic, or digital signals, on which the data and/or instructions are conveyed.

Figure 15:
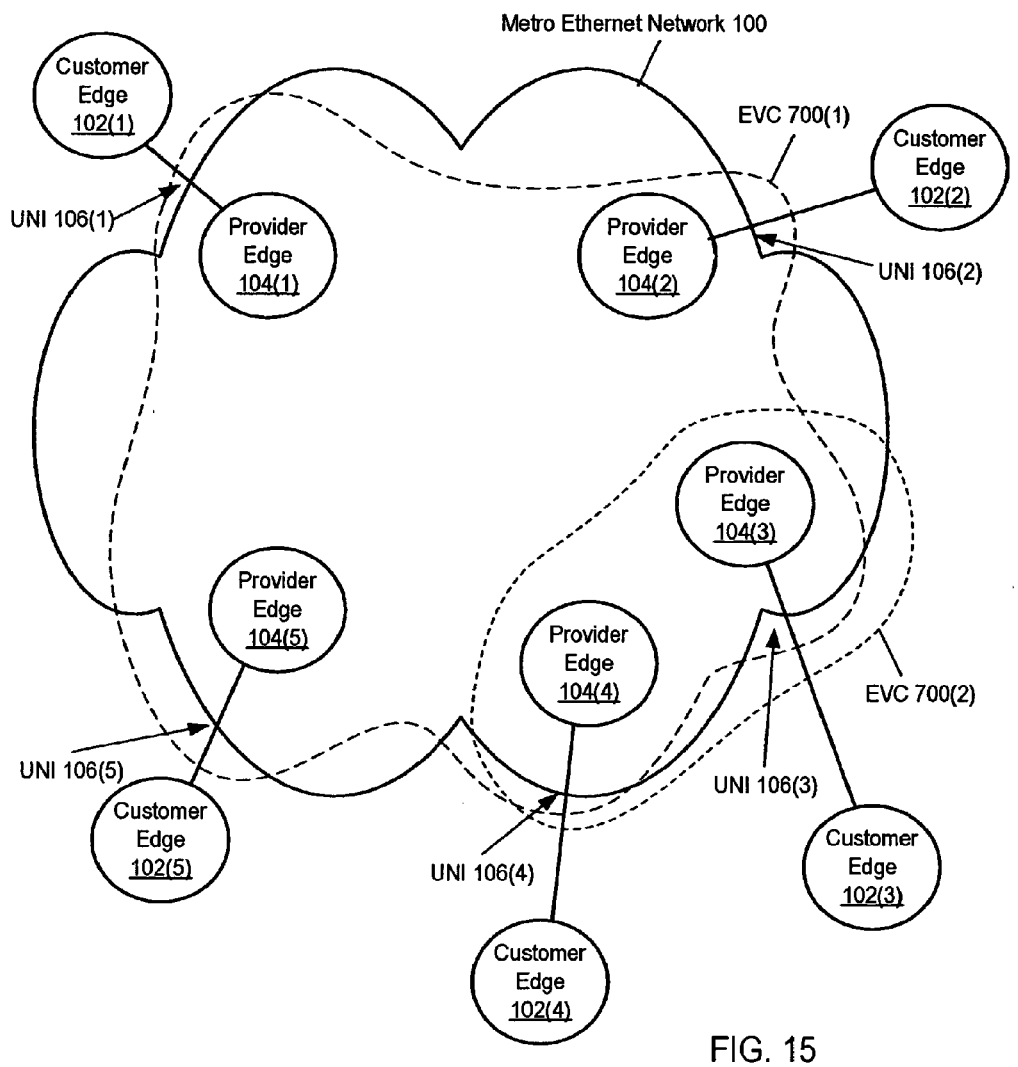
FIG. 15 is a block diagram of a MEN that implements a multipoint-to-multipoint EVC.

FIG. 15 is a block diagram of a MEN that implements a multipoint-to-multipoint EVC. As shown in this example, MEN 100 includes provider edge devices 104(1)-104(5). Each provider edge device is attached to a respective customer edge device 102(1)-102(5) at a respective UNI. Customer edge device 102(1) is coupled to MEN 100 at UNI 106(1). Customer edge device 102(2) is coupled to MEN 100 at UNI 106(2). Customer edge device 102(3) is coupled to MEN 100 at UNI 106(3). Customer edge device 102(4) is coupled to MEN 100 at UNI 106(4). Customer edge device 102(5) is coupled to MEN 100 at UNI 106(5).

Two EVCs have been implemented within MEN 100. EVC 700(1) includes UNIs 106(1)-106(5). Accordingly, EVC 700(1) provides a multipoint-to-multipoint connection between customer edge devices 102(1)-102(5). In a multipoint-to-multipoint connection, each customer edge device 102(1)-102(5) can send a message directly to any of the other customer edge devices coupled by multipoint-to multipoint EVC 700(1). EVC 700(2) includes UNIs 106(3)-106(4) and provides a multipoint-to-multipoint connection between customer edge devices 102(3) and 102(4). While EVC 700(2) is currently only being used to connect two customer edge devices (and thus is currently functioning as a point-to-point connection), EVC 700(2) differs from a point-to-point connection in that additional UNIs are allowed to join (and subsequently leave) EVC 700(2) without disrupting EVC 700(2).

It is noted that point-to-multipoint EVCs can also be implemented within a network such as MEN 100. Like a multipoint-to-multipoint EVC, a point-to-multipoint EVC is capable of including more than two UNIs. However, unlike a multipoint-to-multipoint EVC, a point-to-multipoint EVC restricts communication between customer edge devices coupled by the point-to-multipoint EVC. In a point-to-multipoint EVC, one UNI is designated as the "root" UNI and all of the other UNIs included in the point-to-multipoint EVC are designated as "leaf" UNIs. The customer edge device coupled to the root UNI can send messages to any of the customer edge devices coupled to leaf UNIs. However, the customer edge devices coupled to the leaf UNIs can only send messages to the customer edge device coupled to the root UNI.

Figure 16:
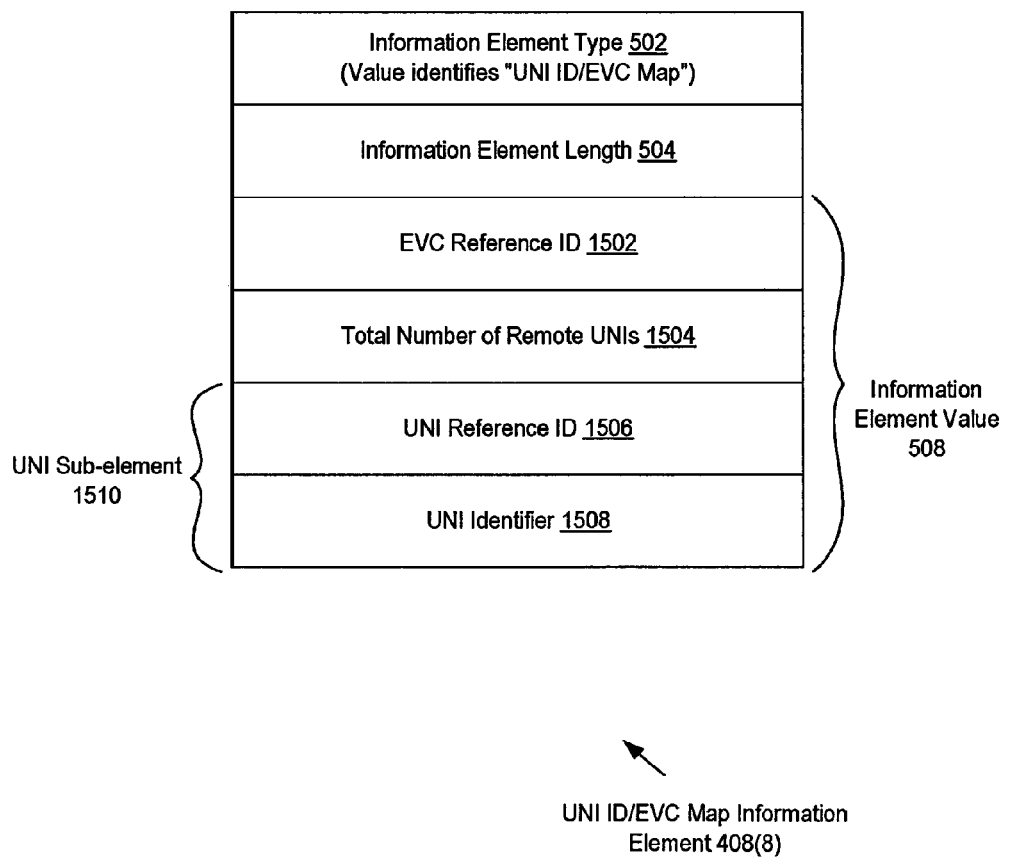
FIG. 16 shows an example of an UNI ID/EVC map information element, according to one embodiment of the present invention.

FIG. 16 shows an example of an additional information element, UNI ID/EVC map information element 408(8), that can be included in E-LMI status messages in embodiments that support multipoint EVCs. Multipoint EVCs are EVCs that are capable of including more than two UNIs (e.g., such as multipoint-to-multipoint EVCs and/or point-to-multipoint EVCs). Other fields (e.g., such as a field that indicates a bandwidth profile for the EVC) can also be included in UNI ID/EVC map information element 408(8) in addition to and/or instead of the fields illustrated in FIG. 16. It is noted that in alternative embodiments, several different types of information elements can be used to convey the information included in UNI ID/EVC map information element 408(8). In one embodiment, a UNI ID/EVC map information element 408(8) can be segmented, if necessary (e.g., in a similar manner to a CE-VLAN ID/EVC map information element).

Like the other information elements shown as examples, UNI ID/EVC map information element 408(8) includes information element type 502, information element length 504, and information element value 508. Information element type 502 indicates that information element 408(8) is a UNI ID/EVC map information element. Information element length 506 indicates the length of information element value 508.

Information element value 508 includes various configuration information indicating the status of a multipoint EVC. In this example, information element value 508 includes EVC reference ID 1502, total number of remote UNIs 1504, UNI reference ID 1506, and UNI identifier 1508. UNI reference ID 1506 and UNI identifier 1508 make up a UNI sub-element 1510. In one embodiment, UNI sub-element 1510 is repeated within information element value 508 for each UNI within the EVC. In other words, if there are four UNIs coupled by the EVC, UNI sub-element 1510 is repeated four times. In another embodiment, UNI sub-element 1510 is only repeated for each remote UNI.

EVC reference ID 1502 includes information identifying the particular multipoint-to-multipoint EVC with which information element 408(8) is associated. Total number of remote UNIs 1504 includes information that identifies the number of remote UNIs included in the EVC (e.g., if there are ten UNIs within the EVC, including the UNI via which information element 408(8) is being conveyed), this number will be nine). It is noted that an alternative embodiment could instead simply specify the total number of UNIs within the EVC.

UNI reference ID 1506 is a value that identifies one of the UNIs within the EVC. For example, in one embodiment, UNIs are assigned sequential numbers and these sequential numbers are used to differentiate UNIs within the network. As described above, UNI identifier 1508 is a value that identifies the UNI (e.g., by specifying the location of the customer edge device coupled to the UNI). In one embodiment, UNI identifier 1508 includes a string that identifies the location of that customer edge device within the customer's business. For example, for customer edge device 102(1) of FIG. 15, the associated string is: "Kansas City, Headquarters, Fourth Floor Router." In alternative embodiments, other types of information (e.g., such as GPS (Global Positioning System) information) can also (or alternatively) be included in this field. In addition to including the UNI reference ID and UNI identifier of each UNI within the EVC, UNI sub-element

1510 can also include information (not shown) indicating whether each UNI is a root or leaf UNI within the EVC (if the multipoint EVC is a point-to-multipoint EVC).

UNI ID/EVC map information element 408(8) can also include information (not shown) indicating the status of the UNIs within the EVC. For example, the EVC status can be one of: new, active, not active, deleted, or partially active. If one remote UNI within the EVC is currently not operational, that remote UNI can be identified and a flag associated with that remote UNI can be set to indicate that the remote UNI is not operational. In some embodiments, several different "partially active" states can be identified. For example, the status can indicate that a remote UNI (i.e., a UNI other than the UNI via which the information element is being conveyed) within the EVC is disconnected, a remote UNI within the EVC has experienced too many bit-errors, a remote UNI within the EVC only has one-way communication with the MEN, or a remote UNI within the EVC is not reachable. In one embodiment, the status also identifies the affected remote UNI using that remote UNI's UNI reference ID and/or UNI identifier.

A provider edge device generates and sends a UNI ID/EVC map information element 408(8) in response to a status inquiry and/or in response to detecting a change in state of a multipoint EVC. When a customer edge device receives a UNI ID/EVC map information element 408(8), the customer edge device extracts the configuration information from the information element and uses that configuration information to control how the customer edge device interacts with the MEN. For example, if UNI ID/EVC map information element 408(8) indicates that one UNI is not currently operational, and the customer edge device needs to send a message to the customer edge device that is coupled to the MEN by that UNI, the sending customer edge device determines that the message will not be successfully received if the message is sent via the multipoint-to-multipoint EVC. In such a situation, the sending customer edge device attempts to find another route (e.g., using another EVC within the MEN or using another network instead of the MEN) via which to send the message.

Although the present invention has been described with respect to specific embodiments thereof, various changes and modifications may be suggested to one skilled in the art. It is intended such changes and modifications fall within the scope of the appended claims.

What is claimed is:

1. A method comprising:
   detecting a trigger condition associated with a User-to-Network Interface (UNI) of a Metro Ethernet Network (MEN); and
   sending a message to a customer edge device via the UNI in response to the detecting, wherein the message comprises configuration information, for storage in a configuration information store at the customer edge device, that describes which of a plurality of Ethernet Virtual Connections (EVCs) are currently active EVCs at the UNI, the configuration information store is used to control operations of the customer edge device to only send traffic on the MEN through the currently active EVCs identified by the configuration information, the message is encapsulated in an Ethernet frame, the Ethernet frame comprises a source address and a type field, wherein a value of the type field identifies the Ethernet frame as an Ethernet Local Management Interface (E-LMI) frame, and the detecting and the sending are performed by a provider edge device within the MEN.

2. The method of claim 1, wherein
   the Ethernet frame comprises a destination address, the destination address having a value,
   the value identifying that the Ethernet frame should not be forwarded, and
   the configuration information corresponds to a multipoint EVC configured on the UNI.

3. The method of claim 1, wherein
   the message comprises a message type field, and
   the message type field identifies one of:
      a status message, and
      a status inquiry message.

4. The method of claim 1, wherein
   the message comprises one or more information elements, one of the information elements comprises a flag, and
   the method further comprises:
      setting the flag to indicate whether the one of the information elements spans multiple messages.

5. The method of claim 4, wherein
   the trigger condition comprises receipt of a status inquiry message via the UNI.

6. The method of claim 1, wherein
   the message comprises information identifying each of a plurality of locations of customer edge devices coupled by a multipoint Ethernet Virtual Connection (EVC).

7. The method of claim 6, wherein
   the trigger condition comprises detection of a change of state of the multipoint EVC.

8. The method of claim 6, wherein
   the information identifies a state of a connection to each of the customer edge devices.

9. The method of claim 6, wherein
   the information identifies each of a plurality of UNIs comprised in the multipoint EVC.

10. The method of claim 6, wherein
    the multipoint EVC is a point-to-multipoint EVC, and
    the information identifies whether each of the UNIs is a leaf UNI or a root UNI.

11. The method of claim 10, wherein
    the configuration information identifies one or more of:
       an ingress bandwidth profile of the UNI,
       a state of the UNI,
       a state of the point-to-multipoint EVC,
       an ingress bandwidth profile of the point-to-multipoint EVC, and
       a bandwidth profile of a Class of Service (CoS).

12. A system comprising:
    means for detecting a trigger condition associated with a User-to-Network Interface (UN) of a Metro Ethernet Network (MEN); and
    means for sending a message to a customer edge device via the UNI in response to the trigger condition, wherein the message comprises configuration information, for storage in a configuration information store at the customer edge device, that describes which of a plurality of Ethernet Virtual Connections (EVCs) are currently active EVCs at the UNI, the configuration information store is used to control operations of the customer edge device to only send traffic on the MEN through the currently active EVCs identified by the configuration information, the message is encapsulated in an Ethernet frame, and the Ethernet frame comprises a source address and a type field, and a value of the type field identifies the Ethernet frame as an Ethernet Local Management Interface (E-LMI) frame.

13. The system of claim 12, wherein
    the message comprises information identifying each of a plurality of locations of customer edge devices coupled by a multipoint Ethernet Virtual Connection (EVC).

14. The system of claim 13, wherein
the trigger condition comprises detection of a change of state of the multipoint EVC.
15. The system of claim 13, wherein
the information identifies a state of a connection to each of the customer edge devices.
16. The system of claim 13, wherein
the information identifies each of a plurality of UNIs comprised in the multipoint EVC.
17. The system of claim 16, wherein
the multipoint EVC is a point-to-multipoint EVC, and
the information identifies whether each of the UNIs is a leaf UNI or a root UNI.
18. An apparatus comprising:
a processor;
a memory coupled to the processor, the memory storing instructions executable by the processor, the instructions configured to implement at least a portion of an Ethernet-Local Management interface (E-LMI) protocol module, wherein the E-LMI protocol module is configured to: generate a message, and encapsulate the message in an Ethernet frame comprising a source address, a type field, and a value of the type field, wherein the value of the type field identifies the Ethernet frame as a Local Management Interface (LMI) frame; and
an interface coupled to the E-LMI protocol module, wherein the interface is configured to communicate E-LMI protocol messages via a User-to-Network Interface (UNI) of a Metro Ethernet Network (MEN), wherein the interface is configured to communicate the E-LMI protocol messages in response to detecting a trigger condition associated with the UNI, at least one of the E-LMI protocol messages comprises information identifying each of a plurality of locations of customer edge devices coupled by a multipoint Ethernet Virtual Connection (EVC), the information, for storage in a configuration information store at a customer edge device, describes which of a plurality of Ethernet Virtual Connections (EVCs) are currently active EVCs at the UNI, and the configuration information store is used to control operations of the customer edge device to only send traffic on the MEN through the currently active EVCs identified by the configuration information.
19. The apparatus of claim 18, wherein
the interface is configured to receive a message via the UNI; and
the E-LMI protocol module is configured to extract configuration information for the UNI from the message.
20. The apparatus of claim 18, wherein
the configuration information identifies a state of a connection to each of the customer edge devices.
21. The apparatus of claim 18, wherein
the configuration information identifies each of a plurality of UNIs comprised in the multipoint EVC.
22. The apparatus of claim 21, wherein
the multipoint EVC is a point-to-multipoint EVC, and
the configuration information identifies whether each of the UNIs is a leaf UNI or a root UNI.
23. The apparatus of claim 18, wherein
the at least one of the E-LMI protocol messages comprises additional information identifying one of:
an ingress bandwidth profile of the UNI,
a state of the UNI,
a state of an EVC,
an ingress bandwidth profile of the EVC, and
a bandwidth profile of a Class of Service (CoS).
24. The apparatus of claim 18, wherein
the E-LMI protocol module comprises a message handling module and an error detection module.
25. The apparatus of claim 24, wherein
the message handling module is configured to generate an E-LMI protocol message and to send the E-LMI protocol message to the interface.
26. The apparatus of claim 24, wherein
the message handling module is configured to parse an E-LMI protocol message received via the interface.

* * * * *

UNITED STATES PATENT AND TRADEMARK OFFICE
CERTIFICATE OF CORRECTION

| | |
|---|---|
| PATENT NO. | : 9,225,594 B2 |
| APPLICATION NO. | : 13/784233 |
| DATED | : December 29, 2015 |
| INVENTOR(S) | : Robert W. Klessig, Grace J. Koo and Vojislav Vucetic |

It is certified that error appears in the above-identified patent and that said Letters Patent is hereby corrected as shown below:

In the Claims:

Column 25
Line 33, in Claim 18, insert: -- configuration -- immediately before "information"
Line 36, in Claim 18, insert: -- configuration -- immediately before "information"

Signed and Sealed this
Nineteenth Day of April, 2016

Michelle K. Lee
*Director of the United States Patent and Trademark Office*